May 21, 1929. J. S. SHERMAN 1,714,279
AUTOMOBILE RADIATOR ATTACHMENT
Filed April 18, 1924
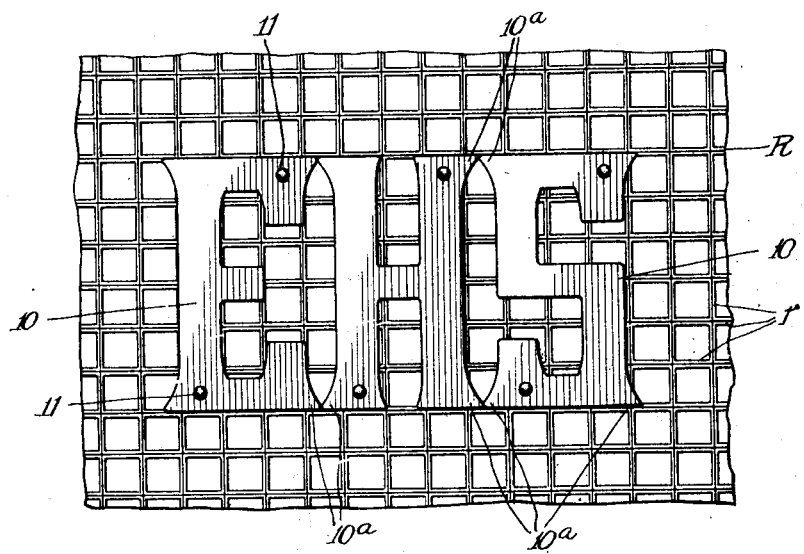
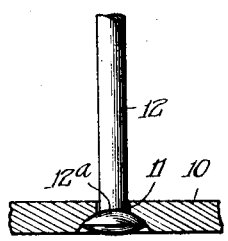 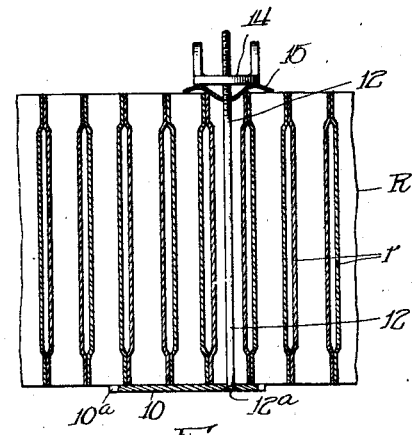 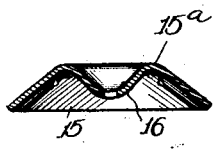
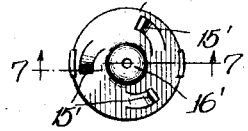 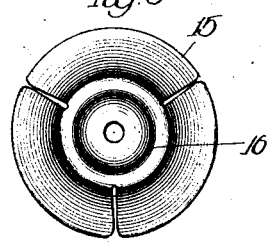 
Inventor:
Jacob S. Sherman Patented May 21, 1929.

1,714,279

UNITED STATES PATENT OFFICE.

JACOB S. SHERMAN, OF CHICAGO, ILLINOIS, ASSIGNOR TO UNIVERSAL LAMP COMPANY, OF CHICAGO, ILLINOIS, A CORPORATION OF ILLINOIS.

AUTOMOBILE RADIATOR ATTACHMENT.

Application filed April 18, 1924. Serial No. 707,400.

This invention relates specifically to automobile radiators, and is directed to the provision of mountings of attachments arranged for assembly with automobile radiators, whereby an identifying or decorative device may be supported for display on the front of the radiator.

The general purpose of the invention is the provision of such a mounting which may be produced at low cost, packed in small compass, and assembled quickly and easily upon any of the various types of so-called "honeycomb" automobile radiators now in general use, without the employment of special tools.

Other objects comprise the provision of such a mounting which will be effective to maintain itself in position and against dislodgment by the vibration of the vehicle incident to its operation, and at the same time which will not interfere with the intended function of the radiator or occasion it any injury, distortion or modification.

Other and further objects will be pointed out hereinafter, indicated in the appended claims or obvious to one skilled in the art upon an understanding of the present disclosure.

For the purpose of this application I have elected to disclose herein certain forms in which the invention may be embodied, but it is to be understood that these are not exhaustive of its variations, but are simply illustrative and hence not to be construed as limiting what I purport to secure, short of the true scope of the invention in the art.

In the accompanying drawing forming a part of this specification,—

Fig. 1 is a front view of a fragmentary portion of an automobile radiator core equipped with the invention;

Fig. 2 is a horizontal sectional detail;

Fig. 3 is an enlarged detail illustrating the connection between the display device and the anchor rod;

Fig. 4 is a detail in the nature of an enlarged sectional elevation of one form of tensioning device;

Fig. 5 is a top view of the same;

Fig. 6 is a top view of another form of tensioning device; and

Fig. 7 is a cross-sectional view of the same on substantially line 7—7 of Fig. 6.

The nature of the invention will be most quickly apparent by reference to the illustrative embodiments. In the illustrations thereof it will be understood that the reference character R designates generally a portion of an automobile radiator core of the so-called honeycomb type, and that the reference character $r$ designates the water circulation tube or cell walls. The character 10 designates a display device shaped to rest against the front side of the radiator core. The forms illustrated constitute letters, which may be formed from sheet metal of substantial weight. A display device is pierced by apertures 11, which preferably are spaced apart substantial distances, both transversely and longitudinally of the device. With the device is associated one or more anchor rods 12. Preferably these are in the form of straight slender bolts having a portion at one end threaded and having their other ends upset to form heads having the spherical under-surfaces $12^a$. These anchor rods are of sufficient length to extend through the air passages of the radiator, and project beyond the rearward side of the latter. A retaining device 14, in the nature of a wing nut, is provided to screw upon the threaded end of each of the anchor rods. In co-operation with this is provided a tensioning device arranged to engage the radiator and react upon the retaining member to maintain the anchor rod under tension longitudinally. In Figs. 2, 4 and 5 is shown a form of tension device 15 in the nature of a dished disk of resilient sheet material. This is apertured centrally to afford passage of the anchor rod, its marginal portion is adapted to contact with the rear marginal portions of the radiator cells or tubes at various points about the rod, and it has an upstruck portion $15^a$ arranged to afford a bearing for the retaining member 14 about the central aperture. In the form illustrated in Figs. 6 and 7 a tensioning device is constituted of resilient portions 15' struck downwardly from the body member of the retaining member 14. In association with the tensioning device may be provided centering means, such as the downwardly struck tapering portions 16 and 16' of the elements illustrated in Figs. 4 and 7. These are inserted within the ends of the radiator air cells where, by co-operation with the walls thereof, they function to center the aperture which receives the rod.

The operation of the device is evident from the foregoing. The display device being positioned on the front of the radiator, the tension rods are inserted through the apertures 11 and projected through air passages in the radiator, and the tensioning devices and retaining members then assembled on the rearward ends of the rods. Screwing down of the retaining members places the tensioning device under compression against the radiator, with the result that tension is induced in the resilient material. This accomplishes a number of purposes. In the first place it prevents distortion of the display device or of the radiator cell walls. In the second place, it provides a take-up for contraction and expansion of the radiator, so that the device is always maintained in proper assembly thereon. In the third place it secures the retaining member by continuous pressure, which prevents its being backed off by the vibration of the vehicle in operation. In the fourth place, in co-operation with the centering means, it assists in holding the rods against lateral vibration or displacement.

Mountings of this type are of particular utility because of their universal applicability, the readiness with which they may be assembled on a radiator, and the security with which they retain their position. They meet a particular demand in the mounting of initials or other display plates on the radiator core, because they are out of sight and have no detrimental effect on the radiator structure, and operate to hold the associated display devices in the proper relationship, such as is desirable in the arrangement of a plurality of initial letters. For the purpose of securing uniform spacing of letters, and to afford support additional to and in co-operation with the anchor rods, I prefer to form the letters with support points or extensions 10ª projecting laterally from the character strokes, at uniform spacing length-wise of the letters, and of equal transverse extent from the median lines of the letters. In the mounting of letters in association, these support points on adjacent letters are placed in contact, which results in the uniform spacing of the letters, their uniform alignment, and a mutual support whereby a co-operation is secured between the anchor rods on different letters. It will be observed that I have shown the location of the anchor rods as at diagonally opposite extremities of the display devices. While I find this arrangement of advantage in holding the devices flat, as well as in proper position, it will be understood that other arrangements may prove advantageous under certain circumstances.

What I claim is:

1. An attachment for automobile radiators comprising, in combination, separate display devices adapted for assembly against the front of the radiator core, anchor rods connected to the respective display devices for extending rearwardly through air channels of the core, adjustable means co-operating with said rods behind the core for tensioning the display devices against the front of the same, and laterally projecting supporting points on the display devices arranged for contact with one another in front of the radiator core, whereby said devices are spaced and afforded mutual lateral support.

2. An attachment for automobile radiators comprising, in combination, a display device adapted to rest against the front of the radiator core, a slender anchor rod adapted to extend through an air channel of the radiator core and having engagement at one end with the display device, a centering device adjustably mounted on the rod and having a portion for engagement in the rear end of a radiator core channel and a portion for engagement with the rear side of the core beyond such channel, and a retaining member adjustably mounted on the rear end of the rod for holding the display device and centering member in clamping engagement with opposite sides of the core.

3. An attachment for automobile radiators comprising a display device adapted for engagement with the front side of the radiator core, a slender anchoring rod adapted for connection with the display device at one end and to extend rearwardly through an air channel of the radiator core, a retaining member adjustably mounted on the rearward end of the rod, and an elastically deformable member adjustably mounted on the rod between the display device and the retaining member and adapted to be pressed against the rear side of the radiator core by adjustment of the retaining member, said elastically deformable member having a tapering portion adapted to enter the rear end of one of the air channels of the core.

4. An attachment for automobile radiators comprising, in combination, a display device adapted to rest against the front of the radiator core, a slender anchor rod adapted for connection at one end to the display device and to extend rearwardly therefrom through an air channel of the radiator core, a retaining member adjustable longitudinally on the rear end portion of the rod, a tension member mounted on the rod to the inner side of the retaining member and adapted to be elastically deformed by compression between the retaining member and the rear side of the radiator core, and centering means adjustably mounted on the rod, said centering means having a tapering portion adapted to be held in the rear end portion of an air channel of the radiator under pressure from the retaining member.

In testimony whereof I have hereunto subscribed my name.

JACOB S. SHERMAN.